US009551792B2

(12) United States Patent
Anandakumar et al.

(10) Patent No.: US 9,551,792 B2
(45) Date of Patent: *Jan. 24, 2017

(54) GPS ANTENNA DIVERSITY AND NOISE MITIGATION

(71) Applicant: MaxLinear, Inc., Carlsbad, CA (US)

(72) Inventors: Anand K. Anandakumar, Carlsbad, CA (US); Maxime LeClercq, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 14/157,179

(22) Filed: Jan. 16, 2014

(65) Prior Publication Data

US 2014/0313079 A1 Oct. 23, 2014

Related U.S. Application Data

(63) Continuation of application No. 13/097,010, filed on Apr. 28, 2011, now Pat. No. 8,665,147.

(Continued)

(51) Int. Cl.
*G01S 19/29* (2010.01)
*G01S 19/24* (2010.01)
(Continued)

(52) U.S. Cl.
CPC ............. *G01S 19/24* (2013.01); *G01S 19/246* (2013.01); *G01S 19/29* (2013.01); *G01S 19/30* (2013.01); *G01S 19/37* (2013.01)

(58) Field of Classification Search
CPC .......... G01S 19/24; G01S 19/29; G01S 19/30; G01S 19/37; G01S 19/246
(Continued)

(56) References Cited

U.S. PATENT DOCUMENTS

| 5,422,913 A | * | 6/1995 | Wilkinson | ................ H04L 1/04 375/260 |
| 6,252,863 B1 | * | 6/2001 | Raby | ....................... G01S 19/22 370/335 |

(Continued)

FOREIGN PATENT DOCUMENTS

| EP | 1102415 A2 | 2/2001 | |
| FI | EP 1102415 A2 | * 5/2001 | ............. G01S 19/29 |

OTHER PUBLICATIONS

International Preliminary Report on Patentability for PCT Application No. PCT/US2011/034390, mailed on Nov. 8, 2012, 7 pages.
(Continued)

*Primary Examiner* — Harry Liu
(74) *Attorney, Agent, or Firm* — Kilpatrick Townsend & Stockton LLP (57) ABSTRACT

A system and method for improving acquisition sensitivity and tracking performance of a GPS receiver using multiple antennas is provided. In an embodiment, the acquisition sensitivity can be improved by determining the correlation weight of each received path signal associated with one antenna from a plurality of antennas and then combining the path signals based on their respective correlation weight. In another embodiment, carrier offset correction information of each path signal is individually determined and then summed together to be used for tracking the code phase in a code phase tracking loop. The code phase tracking loop generates an early code and a late code that are used to determine the code phase error. The system includes digital adaptive filters to mitigate narrowband and broadband noises of a received GPS signal, wherein the digital adaptive filters are switched on periodically or by external events.

21 Claims, 7 Drawing Sheets

Related U.S. Application Data (60) Provisional application No. 61/328,816, filed on Apr. 28, 2010.

(51) Int. Cl.
    *G01S 19/37*     (2010.01)
    *G01S 19/30*     (2010.01)

(58) Field of Classification Search
    USPC .................................................. 342/357.68
    See application file for complete search history.

(56) References Cited

U.S. PATENT DOCUMENTS

| | | | |
|---|---|---|---|
| 6,288,674 B1 | 9/2001 | Sengupta et al. | |
| 7,069,019 B2 * | 6/2006 | Sahai | G01S 19/30 342/357.77 |
| 7,362,795 B1 | 4/2008 | Lennen | |
| 7,605,749 B2 * | 10/2009 | Lawrence | G01S 19/32 342/357.42 |
| 7,961,801 B2 * | 6/2011 | Yan | H04H 60/50 375/260 |
| 8,665,147 B2 | 3/2014 | Anandakumar et al. | |
| 2002/0033766 A1 | 3/2002 | Pratt | |
| 2004/0210389 A1 * | 10/2004 | Zimmerman | G01C 21/165 701/470 |
| 2006/0268964 A1 * | 11/2006 | Song | H04B 7/0848 375/148 |
| 2008/0211715 A1 * | 9/2008 | Feintuch | G01S 19/29 342/357.59 |
| 2009/0029651 A1 * | 1/2009 | Polini | H04W 16/22 455/68 |
| 2009/0135060 A1 * | 5/2009 | Lennen | G01S 19/22 342/357.31 |
| 2009/0227202 A1 | 9/2009 | Doppler et al. | |

OTHER PUBLICATIONS

International Search Report and Written Opinion for PCT Application No. PCT/US2011/034390, mailed on Jul. 8, 2011, 14 pages.

Tanaka et al., "A High Performance GPS Solution for Mobile Use." ION GPS, pp. 1648-1655 (Sep. 24-27, 2002).

Non-Final Office Action for U.S. Appl. No. 13/097,010 mailed Mar. 25, 2013, 8 pages.

Notice of Allowance for U.S. Appl. No. 13/097,010, mailed Oct. 16, 2013, 7 pages.

\* cited by examiner

GPS ANTENNA DIVERSITY AND NOISE MITIGATION

CROSS-REFERENCES TO RELATED APPLICATIONS

This application claims priority to and is a continuation of U.S. application Ser. No. 13/097,010, filed on Apr. 28, 2011 and entitled "GPS ANTENNA DIVERSITY AND NOISE MITIGATION", which application claims benefit under 35 USC 119(e) of U.S. provisional application No. 61/328,816, filed Apr. 28, 2010, entitled "GPS ANTENNA DIVERSITY AND NOISE MITIGATION", the contents of which are incorporated herein by reference in their entirety.

BACKGROUND OF THE INVENTION

The present invention relates to GPS receivers. More particularly, the present invention relates to apparatus and methods for receiving GPS signals using two or more antennas.

A significant cause of errors in positioning systems is signal multipath propagation. Multipath is caused by positioning signals that are reflected from structures before arriving at the receiver. In worst cases, the positioning signals transmitted from the GPS satellites may be canceled by the multipath signals that may arrive at the receiver with 180 degree phase shift relative to the direct path signal.

BRIEF SUMMARY OF THE INVENTION

In accordance with one embodiment of the present invention, a positioning receive system includes two or more antennas that are capable of receiving a radio frequency (RF) signal carrying a positioning signal and two or more radio circuits, each of which is coupled with one of the two or more antennas. Each of the radio circuits processes a received RF signal and converts the processed RF signal to an intermediate frequency (IF) path signal or a baseband path signal. The system further includes a noise mitigation block that reduces noises of the path signals. The noise mitigation block adaptively cancels the strong, external noise of the IF or baseband path signals and outputs them to a signal processing section. In an embodiment, the signal processing section includes an acquisition block that receives a first path signal and a second path signal from the noise mitigation block and performs signal acquisition of the two path signals in the frequency domain. The acquisition block correlates the first and second path signals with a local code and combines the two path signals together based on their respective correlation values. The signal processing section further includes a code-phase tracking block, that generates a first and a second C/A tracked codes from the respective first and second path signals, and a carrier tracking block that interacts with the code-phase tracking block and generates a first and second tracked carriers of the respective first and second path signals. A summing block combines the first and second demodulated output signals to generate the desired signal transmitted by the satellite.

In accordance with another embodiment of the present invention, a positioning device includes, in part, at least two antennas, an acquisition block, and a signal processing block. The acquisition block is adapted to provide coarse-aligned bin values for the code-phase and the carrier frequency of the satellite transmitting the desired signal. Accordingly, the acquisition block correlate a first signal, received via a first antennas, with a locally generated code to generate a first coarse-aligned correlation value associated with the first signal path from which the first signal is received. The acquisition block also correlate a second signal, received via a second antennas, with a locally generated code to generate a second coarse-aligned correlation value associated with the second signal path from which the second signal is received. The acquisition block combines the first and second coarse-aligned correlation values and sends the combined signal to the signal processing block.

The signal processing block includes a code phase tracking block adapted to track the code-phase of the satellite, and a carrier tracking block adapted to track the frequency of the signal used to modulate the desired signal. Code phase and carrier tracking block starts their operations using the code phase and carrier phase data disposed in the combined signal received from the acquisition block. The tracked carrier generated by the carrier tracking block and associated with the first and second antennas is supplied to the code phase tracking block. The tracked C/A code generated by the code phase tracking block and associated with the first and second antennas is supplied to the carrier tracking block. The output signal of the carrier tracking block represent the desired signal transmitted by the satellite and recovered by the positioning device.

In one embodiment, the code phase tracking block supplies a pair of tracked C/A codes to the carrier tracking block. The carrier tracking block uses a first one of the tracked C/A codes to cause the frequency and phase of a first tracked carrier signal it generates to match the carrier frequency and phase of the first received signal. The carrier tracking block uses a second one of the tracked C/A codes to cause the frequency and phase of a second tracked carrier signal it generates to match the carrier frequency and phase of the second received signal.

In another embodiment, the code phase tracking block supplies a single combined tracked C/A code to the carrier tracking block, and the carrier tracking block supplies a pair of tracked carrier signals to the carrier tracking block. In yet another embodiment, the code phase tracking block supplies a single combined tracked C/A code to the carrier tracking block, and the carrier tracking block supplies a single tracked carrier to the code phase tracking block.

In yet another embodiment of the present invention, a method of improving acquisition sensitivity and tracking performance includes receiving a first RF signal and a second RF signal via a respective first antenna and a second antenna, converting the first and second RF signals to a first and second IF or baseband path signals, and reducing noises of the first and second path signals using a noise mitigating component. The method further includes correlating the first and second path signals with a first local code and a second local code to obtain the respective first and second correlation values and combining the two path signals according to their correlation values.

DETAILED DESCRIPTION OF THE INVENTION

High sensitivity GPS receivers may benefit from the use of multiple antennas to compensate for fading impairments. Noise mitigation blocks, acquisition blocks, and tracking blocks may use multiple antennas to reject external noises and interferences adaptively, and to improve acquisition sensitivity and tracking performance. In addition, the use of multiple antennas may remove any outages caused due to orientation of the receiver.

Figure 1:
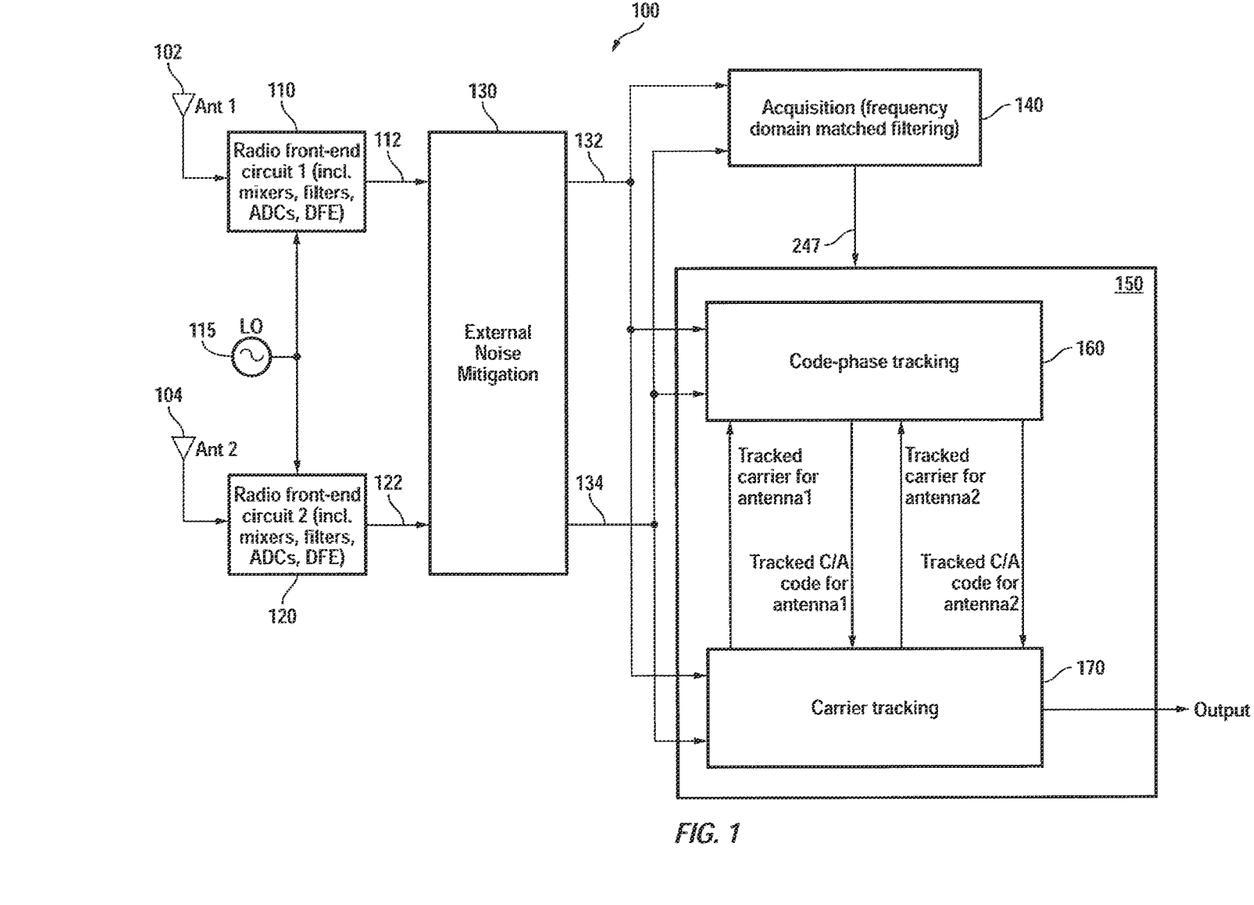
FIG. 1 is a block diagram of a GPS receiver having two antennas according to one embodiment of the present invention.

FIG. 1 is a block diagram of a GPS receiver 100, in accordance with one embodiment of the present invention. GPS radio frequency (RF) signals are received by antennas 102 and 104, disposed in GPS receiver 100 (hereinafter alternatively referred to as receiver), that are coupled to respective radio front-end circuits 110 and 120. Radio front-end circuits 110 and 120 may be conventional RF receivers having a simple or double down-conversion architecture to down-convert the GPS RF signals to intermediate frequency (IF) signals or baseband signals 112 and 122. Although not shown, radio front-end circuits 110 and 120 may include, in part, pre-amplifiers, bandpass filters, mixers, lowpass filters, analog-to-digital converters (ADCs), and digital front-end (DFE) filters. The down-conversion may be accomplished by mixing the received RF signals with the oscillating signal of a local oscillator 115. The analog IF or baseband signal can be converted to a digital IF or baseband signal using analog-to-digital converters.

Signals 112 and 122 are shown as being applied to a noise mitigation block 130 that adaptively cancels or minimizes the external noise component. Noise mitigation block 130 may be a notch filter or a bandpass filter implemented in analog or digital form. In one embodiment, such notch and bandpass filters may be adaptive filters implemented using digital signal processing techniques. The noise mitigation block 130 is described in detail below. Output signals 132 and 134 of external noise migration block 130 are applied to acquisition block 140 and signal processing block 150. Signal processing block 150 is shown as including, in part, a code-phase tracking block 160, and a carrier tracking block 170. A general description of acquisition block 140, code-phase tracking block 160, and carrier tracking block 170 is provided in an article entitled "A High Performance GPS Solution For Mobile Use", by Katsuyuki Tanaka, Takayasu Muto, Katsuya Hori, Mikio Wakamori, Koishiro Teranishi, Hideki Takahashi, Masayuki Sawada, and Matt Ronnig, ION GPS 2002, 24-27 Sep. 2002, Portland, Oreg., the content of which is incorporated herein by reference in its entirety.

Figure 2:
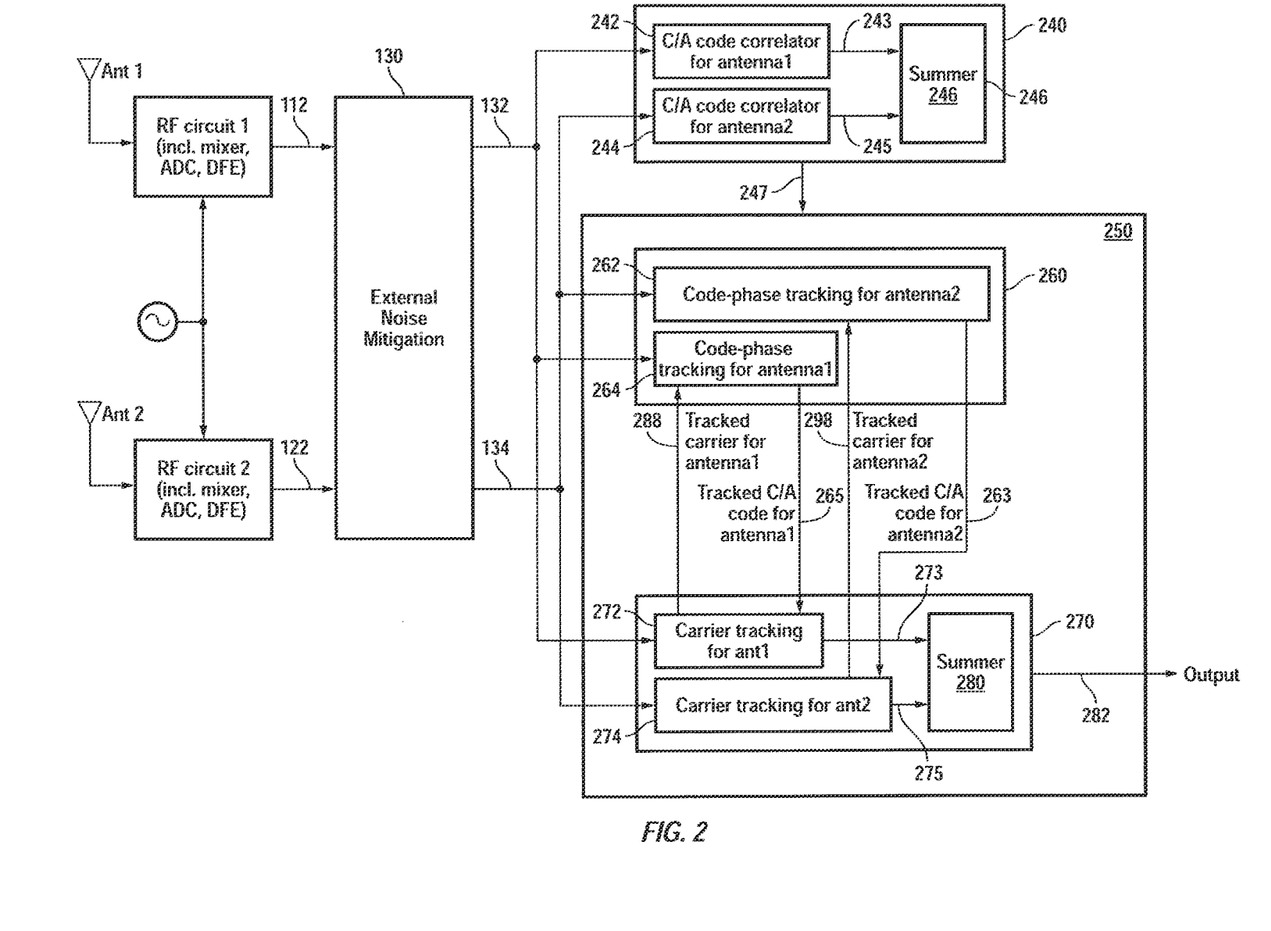
FIG. 2 is a block diagram of a GPS receiver according to one embodiment of the present invention.

FIG. 2 is a block diagram of a GPS receiver 200, in accordance with another embodiment of the present invention. Radio front-end circuits 110 and 120 of GPS receiver 200 are similar to and operate in a manner similar to radio front-end circuits 110 and 120 of GPS receiver 100. Likewise, external noise mitigation blocks 130 of GPS receivers 100 and 200 have similar operations.

Acquisition block 240 is shown as including coarse acquisition (C/A) code correlators (hereinafter alternatively referred to as correlators) 242 and 244, as well as summer 246. Acquisition block 240 is adapted to provide coarse-aligned bin values for the code-phase and the carrier frequency. Correlator 242 is adapted to correlate signal 132, received from external noise migration block 130, with a code sequence that correlator 242 locally generates, to provide a first correlation value 243 associated with the first signal path from which signal 132 is received. Likewise, correlator 244 is adapted to correlate signal 134, received from external noise migration block 130, with a code sequence that correlator 244 locally generates, to provide a second correlation value 245 associated with the second signal path from which signal 134 is received. The coarse-aligned signals 243 and 245 are combined by combiner 246 to generate a combined correlation value.

In one embodiment, summer 246 may combine signals 243 and 245 coherently based on their correlation values (i.e. weighted combining according and proportional to their signal-to-noise ratios). In another embodiment, combiner 246 may add signals 243 and 245 by taking into consideration their phase values only (i.e., simple co-phase combining) Although acquisition block 240 is shown as having two correlators 242 and 244, it is understood that in other embodiments acquisition block 240 may include a single correlator that performs the operations of two or more correlators, such as correlators 242 and 244. Such a correlator may be implemented in hardware, software, or firmware, and perform the correlation operations in series or in parallel.

Based on the combined correlation value supplied by acquisition block 240, a decision can be made as to whether a signal from a satellite is present. If a signal from a satellite is detected as being present, the bin corresponding to a maximum correlation value provides carrier frequency offset and the code phase of the C/A code. The value of the maximum correlation value is a measure of the signal strength. Signal 247 is shown as being applied to digital signal processing unit 250.

Signal processing unit 250 is shown as including a code-phase tracking block 260 and a carrier tracking block 270. Code-phase tracking block 260, in turn, is shown as including code-phase tracking units 262 and 264. Carrier tracking block 270 is shown as including carrier tracking units 272, 274, as well as a summer 280. Output signal 247 indicates the acquisition code of the satellite whose code-phase and carrier frequency are tracked by block 250. Code-phase tracking block 260 is adapted to track the code-phase of the satellite. Carrier tracking block 270 is adapted to track the frequency of the signal used to modulate the desired signal.

Code-phase tracking unit 264 is adapted to change the alignment of signal 134 using the coarse-aligned C/A code 247 to generate a tracked C/A code 265. Likewise, code-phase tracking unit 262 changes the alignment of signal 132 using the coarse aligned C/A code 247 to generate a tracked C/A code 263. Although code-phase tracking block 260 is shown as having two code-phase tracking units 262 and 264, it is understood that in other embodiments code-phase tracking block 260 may include a single code-phase tracking circuit that performs the operations of two or more code-phase tracking units, such as code-phase tracking circuits 262 and 264. Such a code tracking unit may be implemented in hardware, software, or firmware, and perform the tracking operations in series or in parallel. Code-phase tracking block 260 starts its operation using the code phase disposed in signal 247. Likewise, carrier tracking block 270 starts its operation using the carrier frequency disposed in signal 247. A code-phase tracking unit, in accordance with embodiments of the present invention, is described in detail below.

Carrier tracking unit 272 is adapted to fine-tune locally generated signal 273 using the tracked C/A code 265 so as to cause the frequency and phase of signal 288 to match the carrier frequency and phase of signal 132. Likewise, carrier tracking unit 274 is adapted to fine-tune locally generated signal 275 using the tracked C/A code 263 so as to cause the frequency and phase of signal 298 to match the frequency and phase of signal 134. Summer 280 is adapted to combine signals 273 and 275 to generate signal 282 which is the desired signal. A carrier tracking unit, in accordance with embodiments of the present invention, is described in detail below. Signal 288 is the tracked carrier signal associated with antenna 1. Likewise, signal 298 is the tracked carrier signal associated with antenna 2. As shown in FIG. 2, the code-phase associated with antenna 1 and tracked by code-phase tracking unit 264 is supplied via signal 265 to carrier tracking unit 272 also associated with antenna 1. The code-phase associated with antenna 2 and tracked by code-phase tracking unit 262 is supplied via signal 263 to carrier tracking unit 274 also associated with antenna 2. The carrier signal associated with antenna 1 and tracked by carrier tracking unit 272 is supplied via signal 288 to code-phase tracking unit 264. The carrier signal associated with antenna 2 and tracked by carrier tracking unit 274 is supplied via signal 298 to code-phase tracking unit 262.

Figure 3:
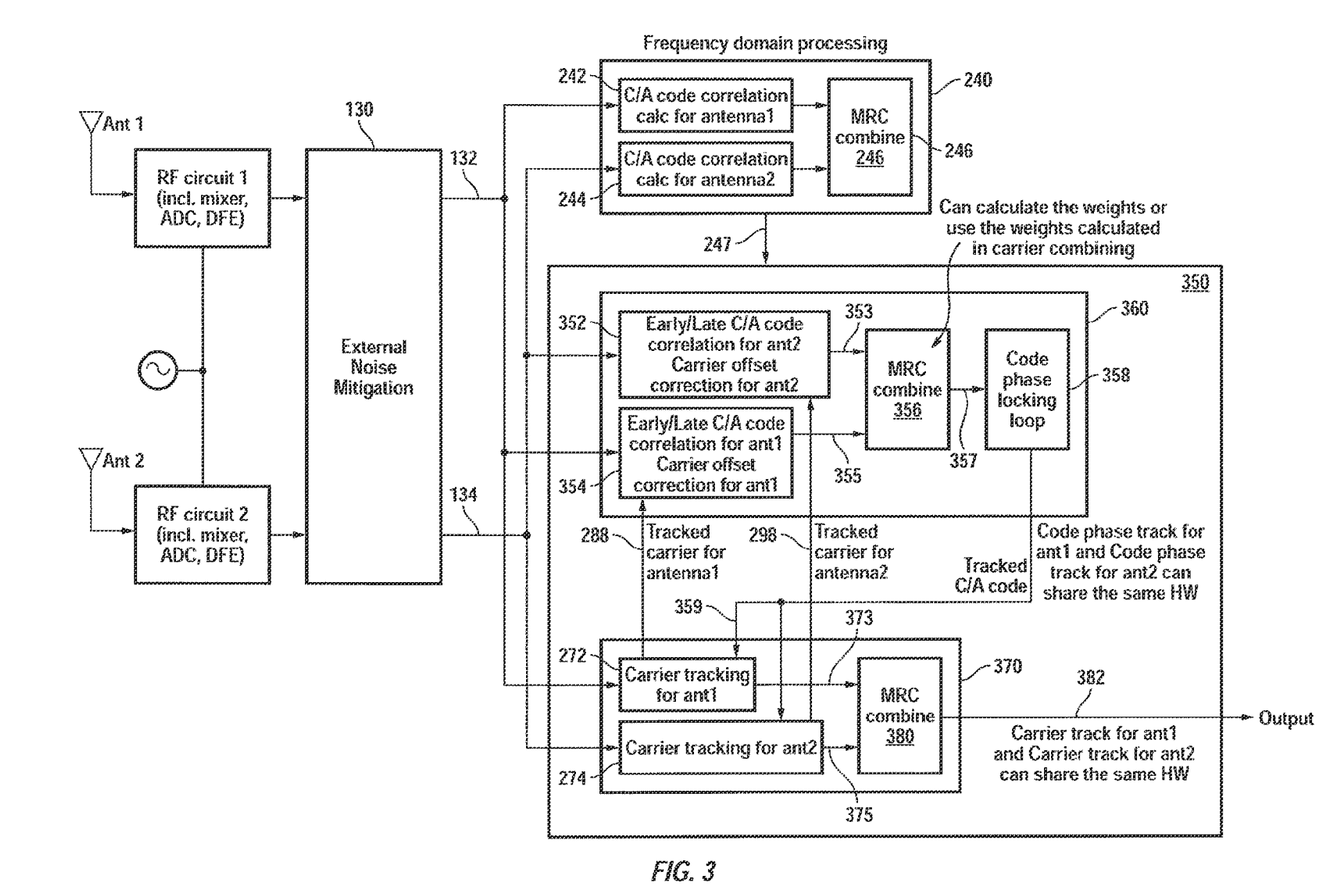
FIG. 3 is a block diagram of a GPS receiver according to one embodiment of the present invention.

FIG. 3 is a block diagram of a GPS receiver 300, in accordance with another embodiment of the present invention. Radio front-end circuits 110 and 120 of GPS receiver 300 are similar to and operate in a manner similar to radio front-end circuits 110 and 120 of GPS receiver 100. Likewise, external noise mitigation block 130 is similar to and operates in a manner similar to external noise mitigation block 130 of GPS receiver 100. GPS receiver 300 is also shown as including an acquisition block 240 and a signal processing block 350.

Acquisition block 240 is shown as including correlators 242 and 244, as well as MRC (maximum ratio combining) combine block 346. Correlator 242 of GPS receiver 300 is similar to and operates in the same manner as correlator 242 of GPS receiver 200. Likewise, correlator 244 of GPS receiver 300 is similar to and operates in the same manner as correlator 244 of GPS receiver 200.

Signal processing unit 350 is shown as including a code-phase tracking block 360 and a carrier tracking block 370. Code-phase tracking block 360, in turn, is shown as including a first early/late code correlator 352, a second early/late code correlator 354, an MRC combine unit 356, and a code phase tracking loop 358. Carrier tracking block 370 is shown as including carrier tracking units 272, 274, as well as a MRC combine block 380. Code-phase tracking block 360 starts its operation using the code phase disposed in signal 247. Likewise, carrier tracking block 370 starts its operation using the carrier frequency disposed in signal 247.

Early/late code correlator 352 is adapted to correlate signal 134 with coarse-aligned C/A code signal 247 and its replica representing the early and late arriving code signals. The early and late code signals are correlated with the first path signal 132 (in block 354) to provide a first early and a first late correlation values 355. The early and late code signals are also correlated with the second path signal 134 to provide a second early and a second late correlation values 353. The early and late correlation values 353 and 355 are then summed by MRC combine block 356 which in response generates phase offset correction information signal 357. MRC combine block 356 is adapted to add the values represented by signals 353 and 355 in proportion to their signal-to-noise ratios. In one embodiment, MRC combine block 356 is a maximal-ratio combining summer. Code-phase tracking loop 358 is adapted to further refine the combined phase offset correction information signal 357 to generate a tracked C/A code 359 that is applied to both carrier tracking units 272 and 274. Early/late code correlation circuit, in accordance with an embodiment of the present invention, is described in detail below.

Carrier tracking unit 272 is adapted to fine-tune locally generated signal 373 using the tracked C/A code 359 so as to cause the frequency and phase of signal 288 to match the carrier frequency and phase of signal 132. Likewise, carrier tracking unit 274 is adapted to fine-tune locally generated signal 375 using the tracked C/A code 359 so as to cause the frequency and phase of signal 298 to match the frequency and phase of signal 134. Summer 380 is adapted to combine signals 373 and 375 to generate signal 382 which is the desired signal. A carrier tracking unit, in accordance with embodiments of the present invention, is described in detail below.

Figure 4:
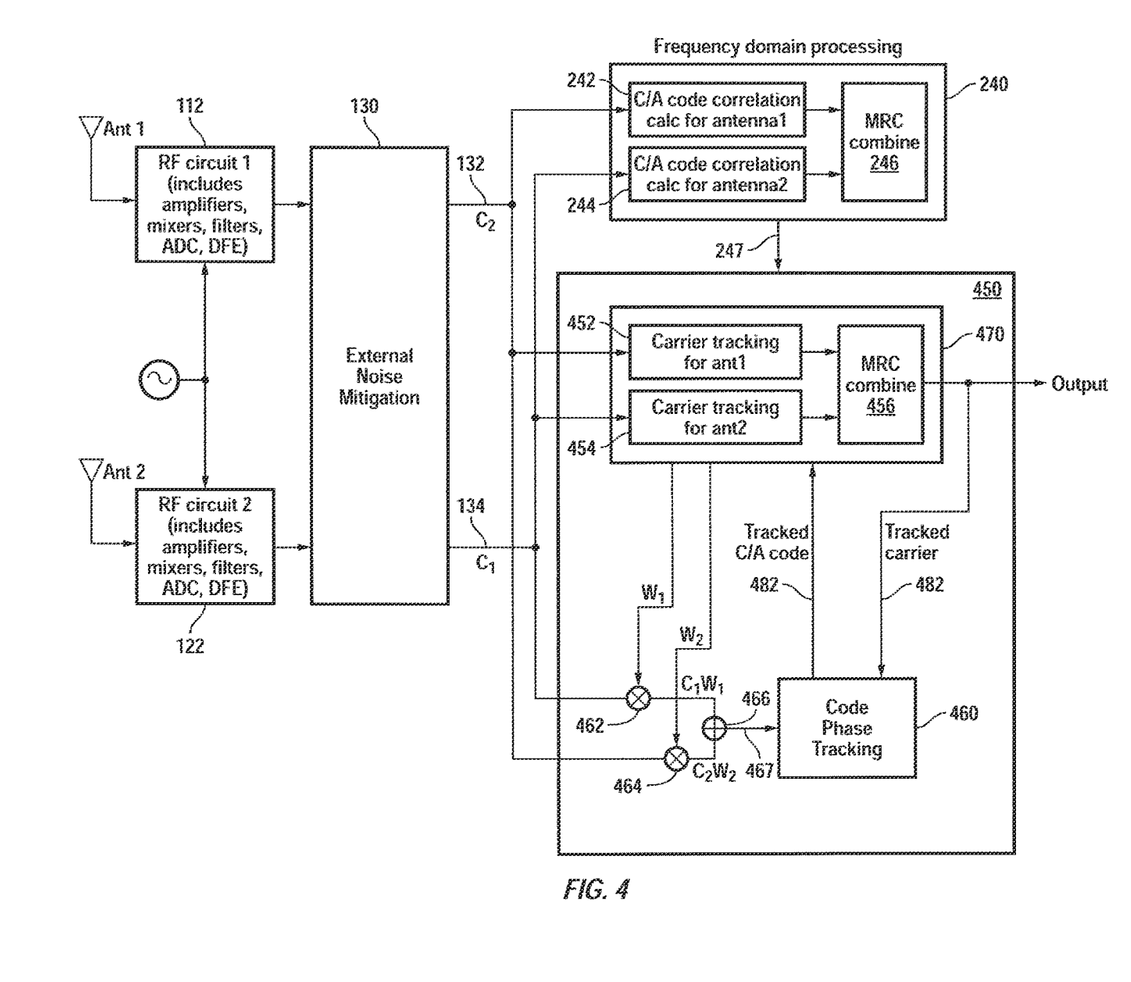
FIG. 4 is a block diagram of a GPS receiver according to one embodiment of the present invention.

FIG. 4 is a block diagram of a GPS receiver 400, in accordance with another embodiment of the present invention. Radio front-end circuits 112 and 122 of GPS receiver 400 are similar to and operate in the same manner as radio front-end circuits 112 and 122 of GPS receiver 100. External noise mitigation block of GPS receiver 400 is similar to and operates in the same manner as external noise mitigation block 130 of GPS receiver 100. Acquisition block 240 of GPS receiver 400 is similar to and operates in the same manner as acquisition block 240 of GPS receiver 100.

Signal processing block 450 is shown as including a carrier tracking block 470, a code-phase tracking block 460, multipliers 462, 464 and adder 464. Carrier tracking block 470 is adapted to perform carrier tracking functions on the path signals 132 and 134 using the tracked C/A code 428 that code-phase tracking block 460 supplies thereto. Each of the first and second path signals 132 and 134 has an associated amplitude and a phase. As seen from FIG. 5, code phase tracking block 460 supplies a single tracked code signal 428 to carrier tracking block 470. Carrier tracking block 470 supplies a single tracked carrier signal 482 to code phase tracking block 460.

First path signal 132 may be expressed as:

$$C_1 = a_1 e^{j\theta_1} s(t) \tag{1}$$

where $a_1$ is the amplitude and $\theta_1$ is the phase of the first path signal 132.

Likewise, second path signal 134 may be expressed as:

$$C_2 = a_2 e^{j\theta_2} s(t) \tag{2}$$

where $a_2$ is the amplitude and $\theta_2$ is the phase of the second path signal 134.

Carrier tracking block 470 outputs weight signals $W_1$ and $W_2$ that may be determined in accordance with the following expressions:

$$W_1 = \frac{a_1^2}{a_1^2 + a_2^2} e^{-j\theta_1} \tag{3}$$

$$W_2 = \frac{a_2^2}{a_1^2 + a_2^2} e^{-j\theta_2} \tag{4}$$

Multiplier 462 multiplies signal 134 (C1) with weight W1 to generate C1W1 which multiplier 462 supplies to adder 466. Similarly, multiplier 464 multiplies signal 132 (C2)

with weight W2 to generate C2W2 which multiplier 464 supplies to adder 466. Adder 466 adds these two products according to the expression:

$$C_1 W_1 + C_2 W_2 \quad (5)$$

Adder 466 supplies the result of the addition 467 to code phase tracking block 460. Output signal 482 of carrier tracking block 470 is the desired signal.

Figure 5:
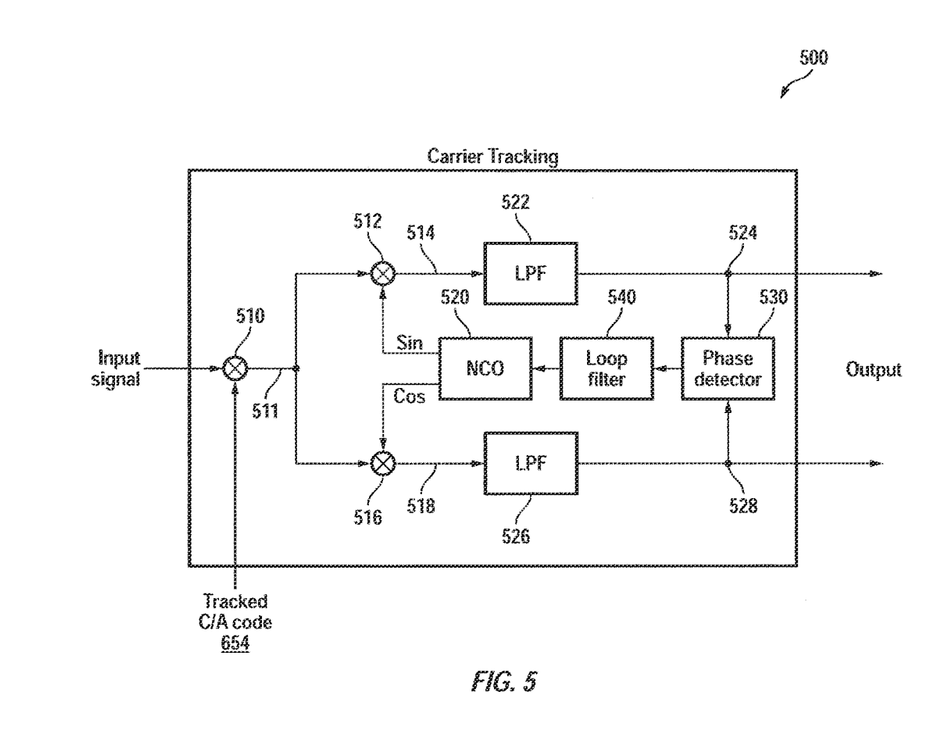
FIG. 5 is a block diagram of a carrier tracking block.

FIG. 5 is a block diagram of a carrier tracking block 500. Carrier tracking block 500 corresponds to carrier tracking blocks shown in FIGS. 2-4. Carrier tracking block includes a phase locked loop configured to track the frequency of the carrier signal used to modulate the desired signal which is received as an intermediate frequency (IF) or baseband signal 132 or 134.

Multiplier 510 is adapted to correlate the received input signal (shown as signals 132 or 134 in FIGS. 2-4) with a tracked C/A code 654 that is supplied by the code phase tracking block (see FIGS. 2-4) to generate, in response, a correlated signal 511. Correlated signal 511 is multiplied with a sinusoidal carrier waveform Sin using multiplier 512 to generate signal 514. Correlated signal 511 is multiplied with a sinusoidal carrier waveform Cos using multiplier 512 to generate signal 518. Signals 514 and 518 are indicative of the frequency offset between the satellite transmission frequency and the received carrier frequency caused by the relative movement between the receiver and the orbiting satellite. Difference signals 514 and 518 are filtered respectively by lowpass filters 522 and 526 to generate signals 524 and 528. Phase detector 530 detects the difference between phases of signals 524 and 528. The detected difference between phases of signals 524 and 528 is to applied to oscillator 520, after passing through low-pass filter 526, to vary the oscillation frequency of sinusoidal signals 516 and 518. Carrier tracking block 500 is described in the article "A High Performance GPS Solution For Mobile Use", by Katsuyuki Tanaka, Takayasu Muto, Katsuya Hori, Mikio Wakamori, Koishiro Teranishi, Hideki Takahashi, Masayuki Sawada, and Matt Ronnig, ION GPS 2002, 24-27 Sep. 2002, Portland, Oreg.

Figure 6:
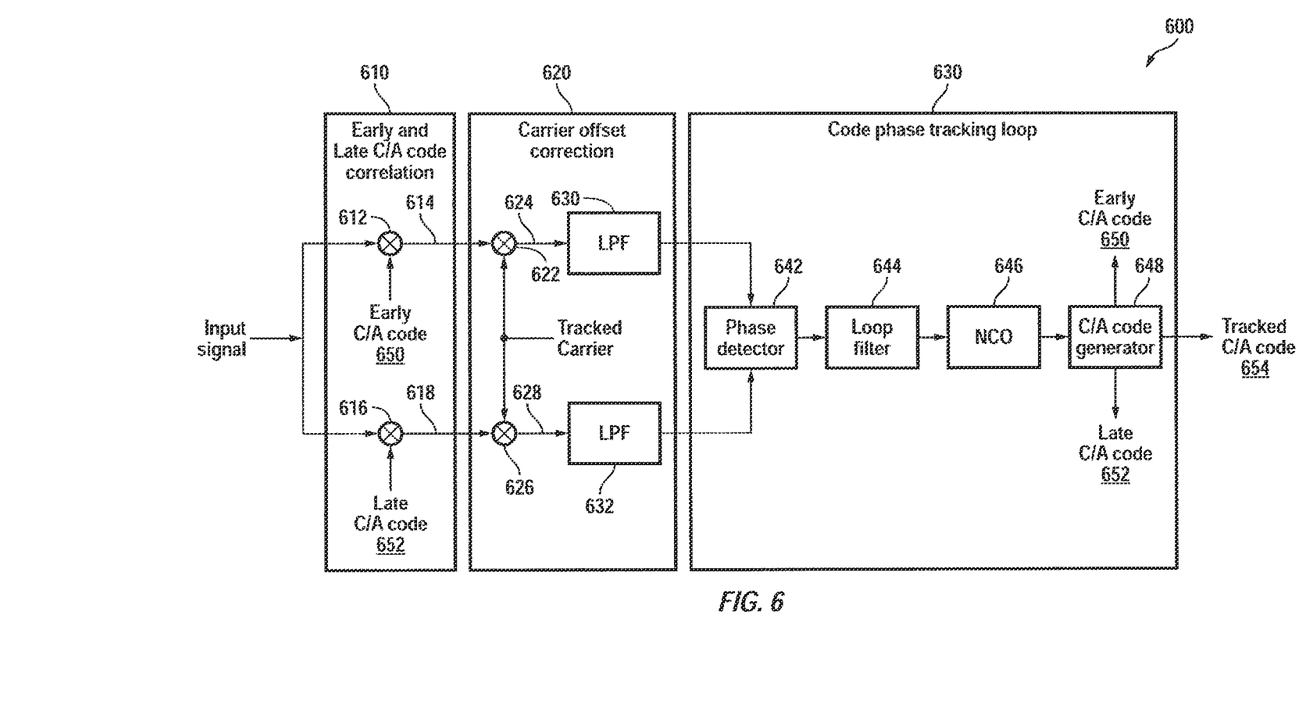
FIG. 6 is an block diagram of portions of a code tracking block.

FIG. 6 is a block diagram of a code phase tracking block 600. Code phase tracking block 600 corresponds to code tracking block 360 of FIG. 3. Code phase tracking block 600 is shown as including an early/late code correlation block 610, a carrier offset correction block 620, and a code phase tracking loop 630. Code phase tracking block 600 is described in the article "A High Performance GPS Solution For Mobile Use", by Katsuyuki Tanaka, Takayasu Muto, Katsuya Hori, Mikio Wakamori, Koishiro Teranishi, Hideki Takahashi, Masayuki Sawada, and Matt Ronnig, ION GPS 2002, 24-27 Sep. 2002, Portland, Oreg.

Early/late code correlation block 610 is shown as including first and second early/late code correlation units 612 and 614 each adapted to receive one of the received input signals (shown as signals 132 or 134 in FIGS. 2-4). Early/late code correlation unit 612 is adapted to correlate one of the input signals (e.g. 132) with early C/A code 650, generated by code phase tracking loop 630, to generate an early error signal 614. Early/late code correlation unit 616 is adapted to correlate the other one of the input signals (e.g. 134) with late C/A code 650, generated by code phase tracking loop 630, to generate a late error signal 618. Early and late error signals 614 and 618 are multiplied by the tracked carrier signal (from NCO 520) and using multipliers 622 and 626 to generate carrier offset corrected information 624 and 628 that are low-pass filtered. Code phase tracking loop 630 includes a local C/A code generator 648 that generates an early C/A code 650, a late C/A code 652, and a tracked (prompt) C/A code 654. Early and late error components 614 and 618 are then multiplied with the tracked carrier wave (from NCO 520) to obtain carrier offset corrected information 624 and 628. Phase detector 642 calculates how far the two Early and Late error components are from the each other and uses the code phase error to correct (track) the code phase in a numerical controlled oscillator 646. NCO 646 provides the clock for the local C/A code generator.

As described above, each of GPS receivers 200, 300 and 400 has a carrier tracking block and code-phase tracking block associated with each of the satellites, each of which has a different frequency offset caused from the relative movement between the receiver and satellite.

Figure 7:
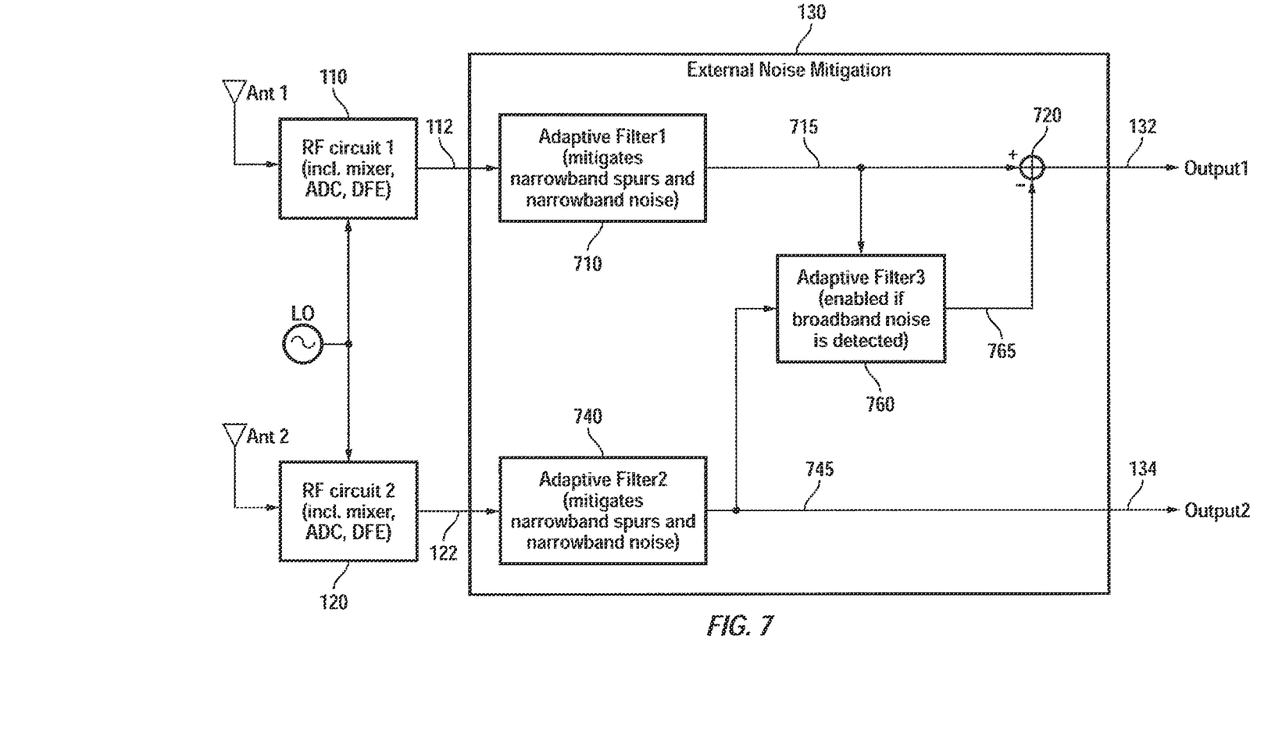
FIG. 7 is a block diagram of a noise mitigation block according to one embodiment of the present invention.

FIG. 7 is a more detailed view of noise mitigation block 130, in accordance with one exemplary embodiment of the present invention, as used in GPS receivers 200, 300 and 400. Noise mitigation block 130 is shown as including adaptive filters 710, 740, and 760. Filter 710 may be an adaptive notch filter to filter any unwanted narrowband noise signal present in baseband signal 112 generated by front-end circuit 110. Likewise, filter 710 may be an adaptive notch filter to filter any unwanted narrowband noise signal present in baseband signal 122 generated by front-end circuit 120. Signal 745, generated by filter 740, is filtered out by filter 760 that operates as an adaptive noise estimator for canceling any broadband noise generated in the receiver system, including any noise generated in front-end circuits 110 and 120 as well as any other blocks, assuming that the noises present at the outputs of the adaptive filters 710 and 740 are correlated. A subtracter 720, also disposed in noise mitigation block 130, subtracts the narrow-band filtered signal 715 from signal 765 output by filter 760.

In some embodiments, filter 760 and the subtracter 720 may be enabled only if the noise present at the outputs of the adaptive filters 710 and 740 are correlated, in which case the two paths are used to cancel out the common broadband noise.

Noise mitigation block 130 is thus adapted to detect the presence of narrow band noise signals and determine the frequencies/bandwidths of the narrowband noise components through a spectral analysis using adaptive filters 710 and 740. Noise mitigation block 130 is thus also adapted to detect the presence of broadband noise signals by correlating the output signals of adaptive filters 710 and 740. The detection of the broadband and narrowband noise components may be run continuously or periodically to reduce power consumption. It is understood, however, that broadband and narrowband noise signals should be detected as soon as they are present.

In some embodiments, noise detection, while being periodically carried out, is also triggered when a circuit disposed in the GPS receiver and known to have unwanted noise characteristics is set in operation. The technique of synchronizing noise detection to external events is applicable to both single antenna system, when for example, only filter 710 is activated, and to multiple antenna system, when all three filters 710, 740 and 760 are activated.

In some embodiment, when no external noise is detected, the various blocks disposed in noise mitigation may be disabled to reduce power consumption. When the GPS signal is strong and hence the diversity is not needed, the receiver can use either one of the demodulation paths (i.e., paths through which signals 132 and 134 travel) and turn off the other demodulation path to reduce power consumption.

What is claimed is:

1. A global positioning system (GPS) receiver comprising:
   a first antenna and a second antenna, the first and second antennas configured to receive a radio frequency (RF) signal carrying a GPS source signal;
   a first radio circuit coupled with the first antenna and configured to down-convert the RF signal to a first signal;
   a second radio circuit coupled with the second antenna and configured to down-convert the RF signal to a second signal; and
   a signal processing section coupled with the first and second signals; wherein the GPS source signal includes a C/A code;
   wherein the signal processor section includes:
   a local code generator that generates a local code and an acquisition block configured to generate a coarse C/A code in response to the C/A code and the local code;
   a carrier tracking block coupled with the first and second signals and configured to generate a first tracked carrier signal and a second tracked carrier signal; and
   a summing block configured to combine the first tracked carrier signal and a second tracked carrier signal to generate a combined tracked carrier signal.

2. The receiver of claim 1 further comprising a noise mitigation block configured to receive the first and second signals and provide noise reduced first and second signals to the signal processing section.

3. The receiver of claim 2 wherein the noise mitigation block comprises digital adaptive filters.

4. The receiver of claim 1 wherein the acquisition block comprises:
   a correlator circuit coupled with the first and second signals and configured to determine a first correlation value and a second correlation value with the local code; and
   a summing circuit configured to combine the first and second signals based on the first and second correlation values to produce the coarse C/A code.

5. The receiver of claim 4 wherein the summing circuit is a maximal-ratio combining block.

6. The receiver of claim 4 wherein the summing circuit is a simple co-phase combining block.

7. The receiver of claim 1 wherein the signal processing section further comprises:
   a code-phase tracking block coupled with the first and second signals and configured to generate a first tracked C/A code and a second tracked C/A code in interaction with the first tracked carrier signal and the second tracked carrier signal.

8. The receiver of claim 7 wherein the code-phase tracking block includes comprises:
   a first early/late C/A code correlator configured to generate a first early/late C/A code;
   a second early/late C/A code correlator configured to generate a second early/late C/A code;
   a first summing circuit that combines the first and second early/late C/A codes and generate a code-phase corrected C/A code; and
   a code-phrase tracking loop circuit configured to receive the code-phase corrected C/A code and generate a tracked C/A code.

9. The receiver of claim 1 wherein
   the carrier tracking block is configured to generate a first weight signal and a second signal; and
   wherein the signal processing section further comprises:
   a first multiplier coupled with the first signal and configured to multiply the first signal with the first weight signal to generate a first weighted signal;
   a second multiplier coupled with the second signal and configured to multiply the second signal with the second weight signal to generate a second weighted signal;
   an adding circuit configured to receive the first and second weighted signals and generate a weighted tracked carrier; and
   a code-phase tracking block configured to receive the weighted tracked carrier and generate a tracked C/A code;
   wherein the tracked C/A code is coupled to the carrier tracking block.

10. A global positioning system (GPS) device for improving carrier tracking performance comprising:
    an acquisition unit including:
    a first code correlator for receiving a first digitized signal including a C/A code and configured to determine a first correlation value of the first digitized signal with a first local code; and
    a second code correlator for receiving a second digitized signal including the C/A code and configured to determine a second correlation value of the second digitized signal with a second local code; and
    a signal tracking unit coupled with the first and second digitized signals and being configured to track code-phase errors of the first and second digitized signals and generate a tracked carrier signal; the signal tracking unit comprising:
    a first multiplier configured to multiply the first signal with a first weight signal to generate a first weighed signal;
    a second multiplier configured to multiply the second signal with a second weight signal to generate a second weighed signal; and
    an adder configured to sum the first and second weighted signals to generate a summed tracked carrier signal.

11. The device of claim 10 wherein the first and second code correlators process the first and second digitized signals in the frequency domain.

12. The device of claim 10 wherein the acquisition block further comprises:
    a summing circuit configured to produce a coarse C/A code by summing the first and second digitized signals based on the first and second correlation values.

13. The device of claim 10 wherein the signal tracking unit further comprises:
    a code-phase tracking block; and
    a carrier tracking block coupled to the code-phase block and configured to generate a summed carrier tracked signal.

14. The device of claim 10 wherein the signal tracking unit further comprises:
    an early/late code correlator for correlating the first and second digitized signals with a plurality of local codes including a first early code, a second early code, a first late code, and a second late code.

15. A method of improving acquisition sensitivity and tracking performance of a global positioning system (GPS) receiver having a plurality of antennas, the method comprising:
    receiving a first GPS signal with a first antenna;
    receiving a second GPS signal with a second antenna;

converting the first GPS signal to a first digitized signal, the first digitized signal including a first C/A code;

converting the second GPS signal to a second digitized signal; the second digitized signal including a second C/A code;

generating a local code;

correlating the first C/A code with the local code to generate a first tracked C/A code;

correlating the second C/A code with the local code to generate a second tracked C/A code;

generating a first tracked carrier with the first tracked C/A code and a second tracked carrier with the second tracked C/A code; and combining the first tracked carrier and the second tracked carrier to generate a combined tracked carrier to improve the tracking performance.

16. The method of claim 15 wherein the first and second GPS signals are from one of a plurality of satellites, and wherein the first and second C/A codes are identical and equal to a source C/A code of the one of the plurality of satellites.

17. The method of claim 15 wherein the carrier tracking comprising:

code-phase tracking the first and second digitized signals to generate respective first and second tracked C/A codes in interaction with the first tracked carrier and the second tracked carrier.

18. The method of claim 15 wherein the carrier tracking comprises:

code-phase tracking a source C/A code based on a summed tracked C/A code.

19. The method of claim 17 wherein the code-phase tracking comprises:

correlating the first digitized signal with a first early code and a first late code corresponding to the source C/A code to produce respective first early and late correlation values;

correcting a first carrier offset based on the first early and late correlation values to generate a first tracked C/A code;

correlating the second digitized signal with a second early code and a second late code corresponding to the source C/A code to produce respective second early and late correlation values;

correcting a second carrier offset based on the second early and late correlation values to generate a second tracked C/A code; and summing the first and second tracked C/A codes to generate the summed tracked C/A code.

20. The method of claim 17 wherein the code-phase tracking comprises:

multiplying the first digitized signal with a first weight signal to generate a first weighted signal;

multiplying the second digitized signal with a second weight signal to generate a second weighted signal;

summing the first and second weighted signals.

21. The method of claim 15 wherein the first and second digitalized signals are noise mitigated using digital adaptive filters.

\* \* \* \* \*